(12) United States Patent
Holtzman

(10) Patent No.: US 9,993,716 B1
(45) Date of Patent: Jun. 12, 2018

(54) SKI OSCILLATION DAMPING APPARATUS

(71) Applicant: Barry Lyn Holtzman, Eagle River, WI (US)

(72) Inventor: Barry Lyn Holtzman, Eagle River, WI (US)

( * ) Notice: Subject to any disclaimer, the term of this patent is extended or adjusted under 35 U.S.C. 154(b) by 0 days. days.

(21) Appl. No.: 15/732,346

(22) Filed: Oct. 27, 2017

(51) Int. Cl.
*A63C 5/075* (2006.01)
*F16F 7/01* (2006.01)

(52) U.S. Cl.
CPC .............. *A63C 5/075* (2013.01); *F16F 7/015* (2013.01); *F16F 2230/10* (2013.01)

(58) Field of Classification Search
CPC .................................. A63C 5/07; A63C 5/075
See application file for complete search history.

(56) References Cited

U.S. PATENT DOCUMENTS

| 2,715,951 | A | | 8/1955 | Lieber | |
|---|---|---|---|---|---|
| 4,018,454 | A | * | 4/1977 | Burkart | A63C 5/052 |
| | | | | | 280/602 |
| 4,563,020 | A | * | 1/1986 | Arieh | F16F 7/108 |
| | | | | | 188/378 |
| 4,674,763 | A | | 6/1987 | Schlagenhaufer | |
| 5,678,840 | A | * | 10/1997 | Simonian | A63C 5/06 |
| | | | | | 188/268 |
| 6,158,747 | A | * | 12/2000 | Magnani | A63C 5/075 |
| | | | | | 280/11.14 |
| 6,182,998 | B1 | | 2/2001 | Huyghe et al. | |
| 7,080,849 | B2 | | 7/2006 | Lammer | |
| 2003/0155740 | A1 | * | 8/2003 | Lammer | A63C 5/075 |
| | | | | | 280/602 |

FOREIGN PATENT DOCUMENTS

DE        1960408        6/1971

* cited by examiner

*Primary Examiner* — John D Walters
*Assistant Examiner* — James J Triggs

(57) ABSTRACT

An apparatus which damps oscillation in a ski, the apparatus comprising an enclosure, a cavity encompassed by the enclosure, and an aggregate located in the cavity. The cavity has a dimension in a direction perpendicular to a gliding surface of the ski which is larger than a thickness of the ski in a location adjacent to the enclosure. The aggregate, in its tapped density, occupies substantially less volume than a volume of the cavity, thereby allowing significant travel of the aggregate in the cavity. Oscillation accelerates and decelerates the enclosure, resulting in accelerations and decelerations of the aggregate which cause it to acquire and lose kinetic energy. The aggregate's acquisition and loss of kinetic energy attenuates the oscillation.

20 Claims, 2 Drawing Sheets

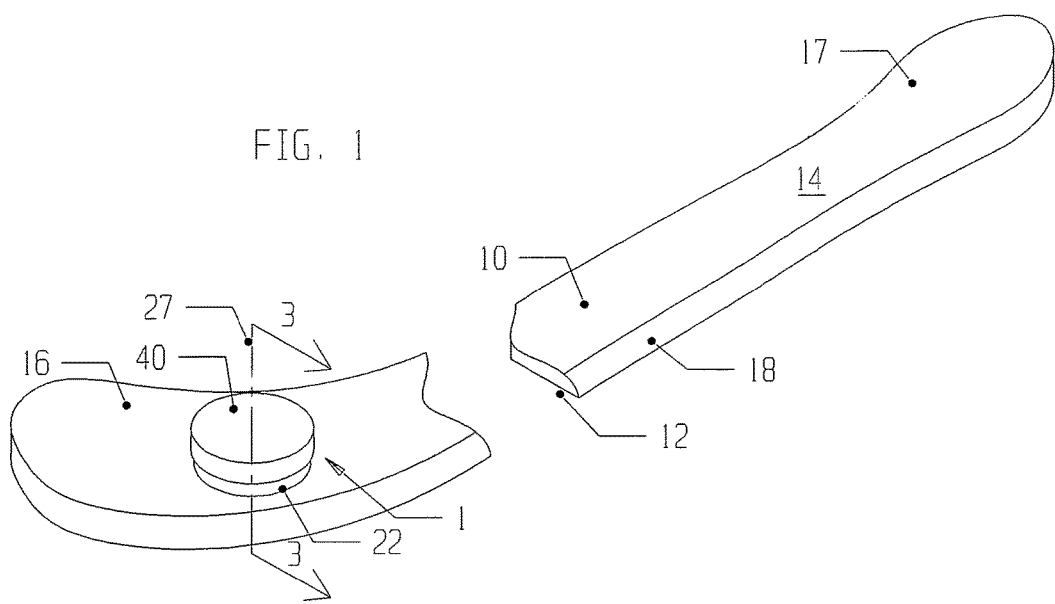
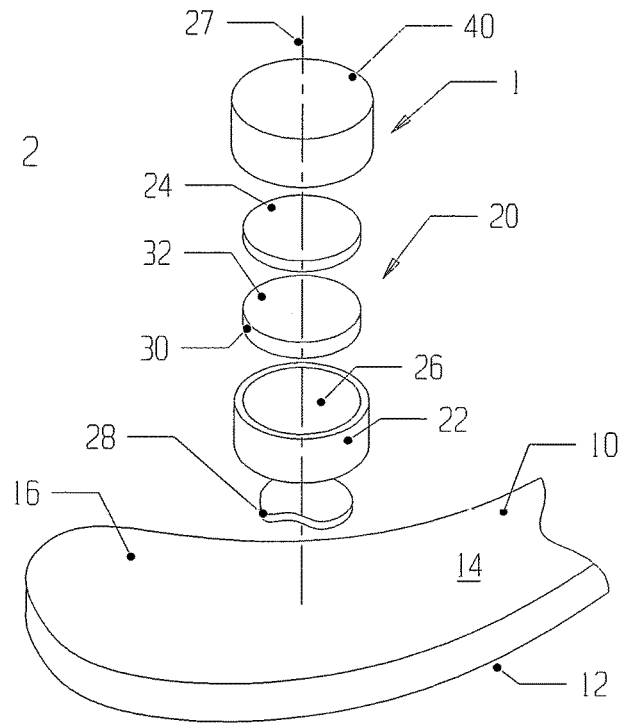

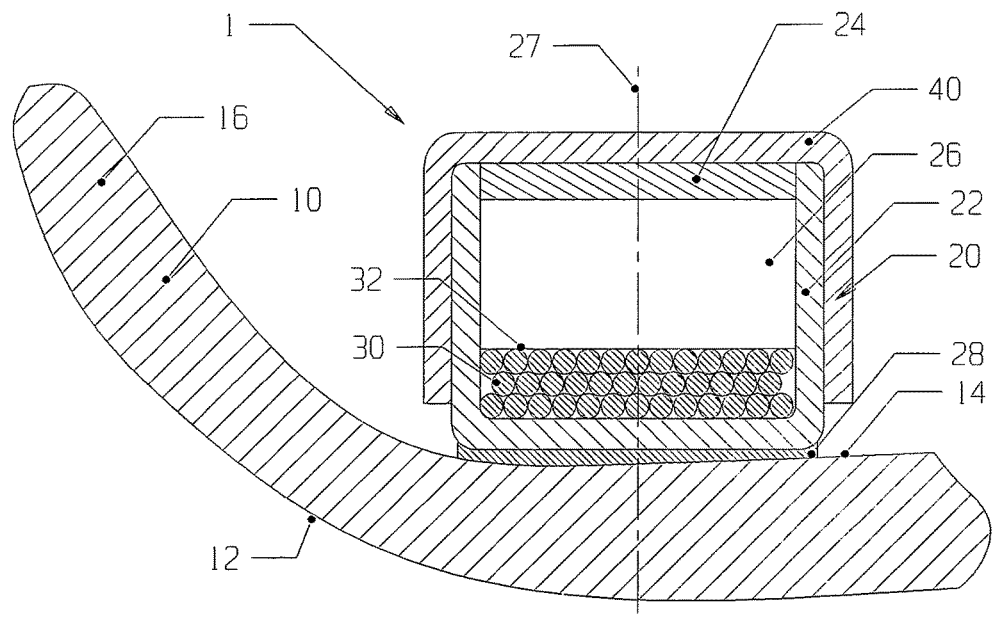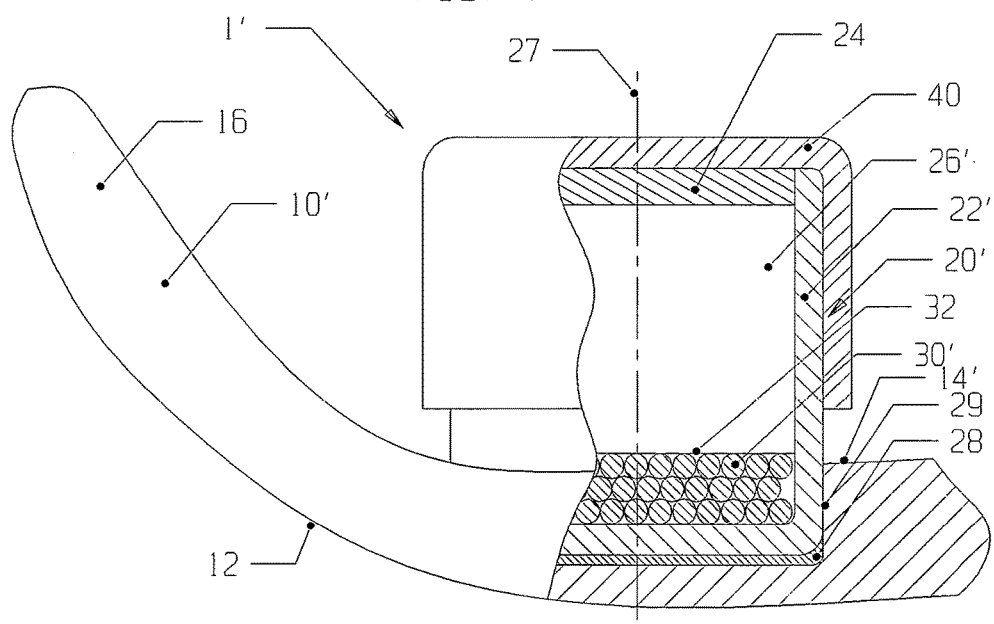

SKI OSCILLATION DAMPING APPARATUS

CROSS REFERENCE TO RELATED APPLICATIONS

Not Applicable

FEDERALLY SPONSORED RESEARCH OR DEVELOPMENT

Not Applicable

SEQUENCE LISTING, TABLE, OR PROGRAM

Not Applicable

BACKGROUND

Field

This application relates to an apparatus which attenuates oscillation in a gliding device such as a snow ski.

Prior Art

Although applicable to a water ski, snow board, or other types of gliding devices, the following discussions particularly reference a snow ski. A snow ski has a gliding surface on its lower side, a top surface on its upper side, a tip at its leading end, a tail at its trailing end, and a waist between. From tip to tail, the ski typically is curved in a direction perpendicular to its gliding surface, having camber wherein its waist area is curved upwardly and having rocker wherein its tip and/or tail are curved upwardly. It also has a left side and a right side, and these sides normally have symmetry with respect to a plane which is substantially perpendicular to its running surface, this plane herein defined as a vertical plane of symmetry. An intersection of the vertical plane of symmetry with the gliding surface is herein defined as an axis of the ski, and under the condition that the ski has camber and/or rocker, this axis is curved.

A snow ski has several modes of oscillation which are stimulated when forces bend the ski from its natural shape, such as forces applied by a skier or by an encounter with uneven snow conditions. The oscillation can occur near the tip end of the ski, near its tail end, or at both ends simultaneously. The following discussions are applicable to oscillation at any location on the ski but will concentrate primarily on oscillation at the ski's tip end. One mode is vertical planar oscillation in which the ski's axis remains in its vertical plane of symmetry during the oscillation. A second mode is torsional oscillation in which the ski is "twisted" and its axis no longer lies in its vertical plane of symmetry. A third mode is horizontal oscillation in which the ski's axis is deflected in a direction which is perpendicular to the ski's vertical plane of symmetry. The oscillation can be a "pure" oscillation, wherein it is exclusively one of the three modes, or it can be various combinations of modes.

Oscillation in a ski makes it difficult for a skier to control the ski, therefore it is desirable that the oscillation be attenuated, or damped. Since there is no such thing as perpetual motion, a ski must have some "intrinsic damping" which is determined by the ski's construction, including it shape, thickness, and material selection. It is of benefit, however, especially in performance skis used by aggressive skiers, to provide supplemental damping to further attenuate a ski's oscillations over that which is provided by its intrinsic damping.

Several oscillation damping devices have been patented which use inter-particle friction to damp ski oscillation. U.S. Pat. No. 5,678,840 to Simonian describes a damping device, called a CIFD, "which dissipates low amplitude vibration by inter-particle friction between a plurality of particles packed tightly within a cantilevered tube and where the cantilevered tube has a mass disposed at one end thereof, which mass and tube strike confronting stops to dissipate high amplitude vibration.". U.S. Pat. No. 4,674,763 to Schlagenhaufer describes a "pellet packed damper" with pellets "arranged in layers" wherein friction resulting from relative movement between the layers provides ski oscillation damping. These devices use inter-particle friction to provide oscillation damping, but the particles are "packed" into a space, thereby restricting translational movement of the particles within the space. As discussed later, this reduces their effectiveness in attenuating oscillation, especially oscillation with relatively large amplitude.

German Patent 1,960,408 to Heiland describes several damping mechanisms for a ski. Its FIG. 1 shows a cavity filled with a foam and a liquid, FIG. 2 shows a structure for the foam, FIG. 4 shows a cavity which holds a liquid and into which a granular material is stuffed, and FIG. 5 shows a cavity which holds a solid body and a liquid. These figures show configurations which provide damping due to friction between a liquid and a foam or turbulence between a solid and a liquid. But, in particular, its FIG. 3 shows a cavity 5, located between a top sheet 1 and a bottom sheet 2 of a ski, which is divided into a plurality of prismatic cells 10. Cells 10 are partially filled with a sand 70, and damping is provided by inter-particle friction between granules of sand 70. The damping mechanism as shown in FIG. 3 is limited in its effectiveness because of a relatively short distance sand 70 can travel in cells 10. The travel distance of sand 70, in a direction substantially perpendicular to sheets 1 and 2, is limited due to the relatively close proximity of sheet 1 to sheet 2; skis typically have a relatively short thickness dimension. Travel distance in a direction substantially parallel with sheets 1 and 2 is also limited due to cavity 5 being divided into a plurality of cells, and these cells are even shown as having dimensions parallel with sheets 1 and 2 which are substantially less than their dimensions perpendicular to sheets 1 and 2. The construction shown in FIG. 3 which places severe limits on the travel distance of sand 70 in cells 10 therefore limits this damping mechanism's effectiveness in attenuating oscillation having relatively large amplitude due to reasons which will be discussed later as an important aspect of this application.

It is desirable to have an apparatus which, in a gliding device such as a snow ski, provides supplemental oscillation damping, especially for oscillations which have amplitudes significantly larger than a thickness of the gliding device.

SUMMARY

Described herein are two embodiments of an apparatus which damps oscillation in a ski, the apparatus comprising an enclosure, a cavity encompassed by the enclosure, and an aggregate located in the cavity. The cavity has a dimension in a direction perpendicular to a gliding surface of the ski which is larger than a thickness of the ski in a location adjacent to the enclosure. The aggregate, in its tapped density, occupies substantially less volume than a volume of the cavity, thereby allowing significant travel of the aggregate in the cavity. Oscillation accelerates and decelerates the enclosure, resulting in accelerations and decelerations of the aggregate which cause it to acquire and lose kinetic energy. The aggregate's acquisition and loss of kinetic energy attenuates the oscillation.

DRAWINGS—FIGURES

Drawings are as follows:

FIG. 1 shows, in perspective, a first embodiment of an apparatus of this application attached to a ski, and FIG. 2 shows, in perspective, an exploded view of the embodiment and a portion of the ski.

FIG. 3 shows an assembled sectional view of FIG. 2.

FIG. 4 shows a partial sectional view of a second embodiment of an apparatus of this application.

DRAWINGS—REFERENCE NUMERALS 1 damping assembly, first embodiment
1' damping assembly, second embodiment
10 ski, a gliding device
10' ski, a gliding device
12 gliding surface
14 top surface
14' top surface
16 ski tip
17 ski tail
18 ski waist
20 enclosure, an assembly
20' enclosure, an assembly
22 cup
22' cup
24 plug
26 cavity
26' cavity
27 axis
28 adhesive
29 recess in top surface
30 aggregate, a damping material
30' aggregate, a damping material
32 aggregate surface
40 elastomeric cover DESCRIPTION AND OPERATION—FIGS. 1, 2 and 3—First Embodiment These figures show a first embodiment of an apparatus of this application, a damping assembly 1. Also shown is a gliding device, a ski 10, which has a gliding surface 12, a top surface 14, a tip 16, a tail 17, and a waist 18. Assembly 1 has an enclosure 20 which is an assembly comprising a cup 22 and a plug 24. Enclosure 20 encompasses a cavity 26 shown as being, for instance, substantially cylindrical, with cup 22 providing the cavity's side and bottom surfaces and plug 24 providing its top surface. Enclosure 20, cup 22, plug 24, and cavity 26 have symmetry with respect to an axis 27. An adhesive 28 is used to secure enclosure 20 onto top surface 14 of ski 10 near tip 16. Assembly 1 also comprises a damping material which is an aggregate 30 having an aggregate surface 32 which divides cavity 26 into an upper portion and a lower portion. Assembly 1 further comprises an elastomeric cover 40.

Cup 22 and plug 24 may, for instance, be machined or stamped aluminum parts. The coarse aggregate may be comprised of particles which are commonly considered to be pellets, balls, or shot, and the fine aggregate may be comprised of particles small enough wherein it is, in general, considered to be a powder. Elastomeric cover 40 helps prevent damage to enclosure 20, and may, for instance, be a commercially available vinyl cap. It is to be noted that assembly 1 is affixed to top surface 14, but assembly 1 is herein defined as not being part of top surface 14. Axis 27, as shown, is typically substantially perpendicular to gliding surface 12.

There are practical and aesthetic considerations regarding a height of damping assembly 1. Skiers can "cross their tips" wherein a second ski crosses over tip 16 of ski 10. If assembly 1 were to project above top surface 14 higher than tip 16, this would increase a likelihood of damage due to tip crossings or other impacts. Also, it probably would not be aesthetically pleasing if assembly 1 had a height which caused it to project above tip 16. For a typical snow ski 10, its tip 16 curves upwardly 3.5 cm to 5.0 cm with respect to top surface 14 at axis 27, so, depending on the shape of ski 10, in most cases it is desirable that assembly 1 have a height which is less than 3.5 cm to 5.0 cm.

Aggregate 30 comprises multiple particles, and its mass density varies depending on its history. There are two commonly defined densities for an aggregate, its bulk density and its tapped density. An aggregate's bulk density is a rather "loosely" defined property, it being a density which exists after carefully pouring the aggregate into a container. Tapped density is more carefully defined, there being several standards for its determination, but in general it is a density obtained by placing the aggregate in a container and subjecting the container to several "tappings" which cause the aggregate to "settle" and move toward a maximum density. An aggregate's tapped density is greater than its bulk density. As discussed later, aggregate 30 is periodically decelerated by surfaces of cavity 26. These decelerations are similar to tappings, and after they occur, aggregate 30 has a density which is herein defined as an "operational density". The operational density of aggregate 30 is perhaps slightly less than its tapped density, but the difference is small enough that it does not significantly affect the following discussions. Therefore, for the remainder of these discussions, unless otherwise noted, it will be assumed that aggregate 30 is in a state of having its tapped density.

If damping assembly 1 is tapped repeatedly with axis 27 held in a constant orientation with respect to vertical, aggregate 30 will settle in cavity 26, approach its tapped density, and establish a substantially planar and level surface herein defined as an "aggregate surface". The aggregate surface separates cavity 26 into a lower portion, herein defined as a tapped aggregate space, which contains aggregate 30 in its tapped density and an upper portion which is absent aggregate 30. Particularly, if cavity 26 is substantially cylindrical and if the tapping occurs with its axis 27 positioned vertically, aggregate 30 will assume a shape which is substantially a cylindrical solid as shown in FIG. 2. This cylindrical solid is herein defined as a "tapped aggregate cylinder" and the aggregate surface will substantially be a disc, shown in FIG. 2 as aggregate surface 32. Particularly if aggregate 30 is a mixture of course and fine aggregates, the tapped aggregate cylinder will have relatively smooth surfaces due to the presence of the fine aggregate and will look substantially like the cylindrical solid shown in FIG. 2.

Aggregate 30, like all aggregates, has no defined shape; it is amorphous. Ski 10 and assembly 1 are subjected to various combinations of horizontal, vertical, and torsional oscillations, and aggregate 30, in assembly 1 operation, is "tossed about" in several directions inside cavity 26. However, in descriptions which follow, at times it is useful to treat aggregate 30, "in the aggregate", in total, as if it had a defined shape, as if it were a "mushy solid". For purposes of defining this apparatus, the following discussions will primarily focus on pure vertical planar oscillation of ski 10 and aggregate 30 being in its tapped aggregate cylinder. And even though aggregate 30 is amorphous and therefore subject to some "jostling" of the particles of which it is comprised, a sufficiently accurate assessment of the operation of assembly 1 can be obtained if aggregate 30 is, in total, considered to be a mushy solid when traveling in cavity 26 and interacting with enclosure 20.

Aggregate 30 has two types of velocities which are pertinent to these discussions, and the following is presented to eliminate any confusion. A first type of velocity of aggregate 30 is an absolute velocity; the absolute velocity of aggregate 30 determines its kinetic energy. A second type of velocity of aggregate 30 is a relative velocity; the relative velocity of aggregate 30 is a velocity that it has with respect to enclosure 20, and this relative velocity will, at times, be referred to as a travel of aggregate 30 in cavity 26.

Aggregate 30 has interactions with enclosure 20 which cause it to decelerate. Aggregate 30 comprises many particles, but in defining its operation in assembly 1, aggregate 30 can be considered, in total, to be the somewhat mushy solid described above, capable of nearly perfectly inelastic decelerations by surfaces of cavity 26. Therefore, the decelerations of aggregate 30 resulting from its interactions with enclosure 20 can be represented as occurring with aggregate 30 being the mushy solid described above and in a state of having its operational mass density. In an inelastic deceleration of aggregate 30 by a surface of cavity 26, aggregate 30 loses kinetic energy existing, and this loss occurs through two modes. The first mode is a partially inelastic collision with the surface of cavity 26 of a portion of the particles comprising aggregate 30. Since the collision is only partially inelastic, these particles rebound from the surface at some reduced velocity. The second mode, made possible by the "mushiness" of aggregate 30, is a collision of the rebounding particles with other particles of aggregate 30 which are still traveling toward the cavity 26 surface. Therefore, aggregate 30 experiences a loss of kinetic energy resulting from a deceleration by enclosure 20 due to a collision of a portion of its particles with a surface of cavity 26 and also interparticle collisions.

An important aspect of this apparatus is a dimension which is a "free travel distance" of aggregate 30, herein defined as, under a condition that aggregate 30 is in its tapped aggregate space, a length of a line segment which is perpendicular to its aggregate surface and which has endpoints at its intersections with the upper portion of cavity 26. Under the condition that cavity 26 is cylindrical and therefore the tapped aggregate space is the tapped aggregate cylinder, the free travel distance is a length of a segment of axis 27 which has endpoints at its intersections with the upper portion of cavity 26. It has been found that the free travel distance of aggregate 30 is an important parameter in determining how effectively assembly 1 attenuates oscillation. Specifically, for oscillation amplitudes of interest, increasing the free travel distance of aggregate 30 will increase the effectiveness of assembly 1 in attenuating oscillation. Therefore, to allow a sufficient free travel distance for aggregate 30, it is necessary that cavity 26 have a dimension, measured along axis 27, which is longer than a thickness, measured perpendicularly to gliding surface 12, of ski 10 between its gliding surface 12 and its top surface 14 at a location adjacent to enclosure 20. It has also been found that assembly 1 works well if the free travel distance of aggregate 30 is large relative to a height of its tapped aggregate space. Typically this means that the tapped aggregate space of aggregate 30 should have a volume which is less than half of a volume enclosed by cavity 26. In the particular case wherein cavity 26 has a substantially cylindrical shape, this means assembly 1 works well if the free travel distance of aggregate 30 is larger than a height of its tapped aggregate cylinder measured collinearly with axis 27.

A test which can analyze ski 10 for vertical planar oscillation at its tip 16 end involves clamping ski 10 at some point along its length with a portion of its tip 16 end cantilevered. Typically a boot sole center (BSC) mark is placed on a ski to indicate where a boot binding should place the boot's BSC, and this mark is a useful place to clamp ski 10 to test its vertical planar oscillation. In order to achieve pure vertical planar oscillation, tip 16 of ski 10 should be deflected and released such that the axis of ski 10 remains in its vertical plane of symmetry. A vertical planar oscillation test with ski 10 thus clamped, deflected, and released is herein defined as a BSC clamped tip test.

Ski 10, when tested in the BSC clamped tip test, can be represented as a cantilevered beam spring/mass system. For oscillation analysis of such a system, all masses, including any distributed mass of the beam, can be replaced with a single mass located at any point along the beam. The portion of ski 10 forward of its BSC mark has a distributed mass determined by its material composition, shape, and thickness along its axis, and this distributed mass can be represented by a single "equivalent mass" m located at axis 27. The portion of ski 10 forward of its BSC mark has a stiffness, or spring rate, determined by its material composition, shape, and thickness, and this is the spring of the system. This distributed stiffness can be replaced by a single "equivalent stiffness" k at axis 27, which is a spring rate of the forward portion of ski 10 in which its force component has a vector which is collinear with axis 27.

It is important to make a distinction between two different oscillating systems, an intrinsic system, having intrinsic properties, and a modified system having modified properties. The intrinsic system is herein defined as a system comprising the gliding device, ski 10, and if assembly 1 is affixed thereto, components of assembly 1 which are rigidly affixed, namely enclosure 20, adhesive 28, and elastomeric cover 40. The intrinsic system's properties, its equivalent mass and stiffness at axis 27 and its intrinsic damping provided by ski 10, determine an intrinsic oscillation at an intrinsic frequency f. The modified system is a modified gliding device which comprises the intrinsic system and, additionally, aggregate 30. Aggregate 30 has properties such as mass and ability to damp the oscillation and, as discussed below, at times these properties affect the oscillation and at times they do not. During intervals of time that aggregate 30 does not substantially affect the oscillation, the oscillation proceeds in a manner substantially determined by the intrinsic properties. But during intervals of time that aggregate 30 does affect the oscillation, the oscillation proceeds in a manner determined by a set of modified properties comprising the intrinsic properties and the properties of aggregate 30. Overall, therefore, the resulting oscillation is a modified oscillation, having a modified frequency r which is slower than the intrinsic frequency f and a modified damping which is greater than the intrinsic damping.

An "idealized" analysis is helpful in defining assembly 1 and understanding how it attenuates oscillation. Some "idealized assumptions" can be established which simplify the analysis but yield results sufficiently accurate to define this apparatus. A first assumption is that a skier, with his weight applied to ski 10 at approximately its BSC mark, causes ski 10 to act as in the BSC clamped tip test. A second assumption is that an upwardly directed impulse is applied to ski 10 which causes it to begin a vertical planar oscillation. A third assumption is that the vertical planar oscillation is at a 0 degree angle in its 360 degree cycle when the impulse is applied, at which point ski 10 has its natural, unbent shape. A fourth assumption is that, when the impulse is applied, aggregate 30 is in its tapped aggregate cylinder which occupies a space adjacent to the bottom surface of cavity 26 as shown in FIG. 3. A fifth assumption is that, during the vertical planar oscillation, a point located at an intersection of axis 27 and gliding surface 12 travels collinearly with axis 27 as tip 16 of ski 10 is bent; its travel will actually follow a slight arc. For intervals of time after application of the impulse, as discussed later, aggregate 30 has velocities relative to enclosure 20 as it travels in cavity 26, and a sixth assumption is that, during these intervals of time, aggregate 30 remains in its tapped aggregate cylinder which remains coaxial with axis 27. Because the tapped aggregate cylinder remains coaxial with axis 27, the travels of aggregate 30 in cavity 26, in total, have velocity vectors which are collinear with axis 27 and therefore parallel with the side surface of cavity 26, and therefore a seventh assumption is that the travels of aggregate 30 in cavity 26 are substantially unrestrained except for when aggregate 30 is decelerated by a surface of cavity 26 established by enclosure 20. An eighth assumption is that decelerations of aggregate 30 by surfaces of cavity 26, wherein the decelerations are perpendicular to the surface, are perfectly inelastic. A ninth assumption is that gravity has an insignificant effect. And finally, as discussed above, since enclosure 20, adhesive 28, and elastomeric cover 40 are rigidly affixed to ski 10 and normally have a relatively small mass, a tenth assumption is that these items are part of the intrinsic system. An operation of assembly 1 which meets these conditions is herein referred to as its "idealized vertical planar operation".

The eighth assumption listed above, the assumption concerning inelastic decelerations, might mistakenly be taken to mean that aggregate 30 has zero absolute velocity after these decelerations. But saying the decelerations are perfectly inelastic simply means that aggregate 30 has the same velocity as enclosure 20 after the decelerations. Therefore, even though aggregate 30 has zero relative velocity with respect to enclosure 20, it may still have an absolute velocity.

In an analysis of the idealized vertical planar operation of assembly 1, a first principle to be noted is that the upwardly directed impulse imparts less kinetic energy to the modified system which includes aggregate 30 than it would have imparted to the intrinsic system which does not include aggregate 30. Aggregate 30 is assumed to be resting at the bottom of cavity 26 in its tapped aggregate cylinder when the impulse is applied to ski 10, and therefore the mass of aggregate 30 contributes to a total mass which is accelerated upwardly by the impulse. An impulse imparts momentum to an object independently of the object's mass, but the kinetic energy it imparts is reduced as the object's mass is increased. A prototype of assembly 1, detailed further below, was affixed to top surface 14 of a performance ski 10 in which aggregate 30 had a mass which was approximately 25% of the intrinsic system's equivalent mass at axis 27. For this performance ski 10 and assembly 1 prototype, momentum and kinetic energy calculations determine that the kinetic energy acquired by the modified system from the impulse is only 80% of that which would have been acquired by the intrinsic system. Furthermore, aggregate 30 acquires 25% of the total kinetic energy existing in the modified system and the intrinsic system acquires 75%, meaning the intrinsic system only acquires 60% (75% of 80%) of the kinetic energy that it would acquire absent aggregate 30. This reduction in kinetic energy results in a reduction in initial oscillation amplitude.

A second principle to be noted is that a portion of the kinetic energy acquired by aggregate 30 from the impulse is later converted into other energy forms, and therefore supplemental oscillation attenuation will be ongoing as the oscillation proceeds. After application of the impulse which starts the vertical planar oscillation, the forward portion of ski 10 and enclosure 20 move upwardly. Since aggregate 30 is in its tapped aggregate cylinder which is adjacent to the bottom surface of cavity 26, it also moves upwardly. Assembly 1, including enclosure 20 and aggregate 30, attains an initial absolute upward velocity $V_0$. Since the forward portion of ski 10 is bent upwardly, the stiffness of ski 10 urges it to return to its unbent shape, meaning its forward end immediately begins to decelerate upon cessation of the impulse. Since enclosure 20 is secured onto top surface 14 of ski 10, it also decelerates. But aggregate 30, per the seventh assumption above, does not decelerate but maintains its initial absolute velocity $V_0$ and therefore begins to acquire a relative velocity with respect to enclosure 20. For an interval of time, this relative velocity increases and aggregate 30 travels substantially unrestrained upwardly in cavity 26. At some point in the oscillation, aggregate 30 is decelerated by the upper surface of cavity 26 provided by plug 24. Since it was assumed that cavity 26 and the tapped aggregate cylinder of aggregate 30 are coaxial during the travel of aggregate 30 in cavity 26, the deceleration is perpendicular to the surface and therefore assumed to be perfectly inelastic. This mean that, after the deceleration, aggregate 30 has no relative velocity with respect to enclosure 20. In this inelastic deceleration, momentum is conserved but kinetic energy is not. As a result of the deceleration, most of the kinetic energy in aggregate 30 is converted into other energy forms such as heat and sound, but due to conservation of momentum, some absolute velocity, and hence kinetic energy, remains in aggregate 30 and some of its momentum and kinetic energy is transferred to enclosure 20 and hence to ski 10. But the equivalent mass of the modified system at axis 27 is typically significantly greater than the mass of aggregate 30, and therefore this transfer, as detailed later, is typically relatively small. Therefore, the inelastic deceleration of aggregate 30 by plug 24 of enclosure 20 results in a reduction of kinetic energy in the modified system, and this reduction attenuates the oscillation.

After aggregate 30 is inelastically decelerated by plug 24 of enclosure 20, aggregate 30, in total, is located in a space adjacent to plug 24, a space which, in this idealized vertical planar oscillation operation, is the tapped aggregate cylinder. Aggregate 30 has zero relative velocity with respect to enclosure 20, and it remains adjacent to plug 24 because, since the tip 16 end of ski 10 is bent upwardly, enclosure 20 is being accelerated downwardly. Aggregate 30 is also being accelerated downwardly by the oscillation and hence is acquiring kinetic energy as the oscillation proceeds. When the modified oscillation is approximately at a 180 degree point in its cycle, ski 10 is back in its natural, unbent shape and the downward acceleration of tip 16 and enclosure 20 ceases. Aggregate 30 is still located in the space adjacent to plug 24, and the forward end of ski 10 and assembly 1, including aggregate 30, have a downward absolute velocity. After the 180 degree point in the modified oscillation's cycle, the forward end of ski 10 is bent downwardly and its tip 16 end begins to accelerate upwardly. Enclosure 20 also accelerates upwardly, causing aggregate 30 to leave the space adjacent to plug 24 and acquire a downward relative velocity with respect to enclosure 20. It travels downwardly in cavity 26 toward a future inelastic deceleration by the bottom surface of cavity 26 which is the bottom surface of cup 22.

Conditions existing at and following the 180 degree point in the oscillation's cycle are similar to the conditions which existed at and following the 0 degree point when the impulse was applied except aggregate 30 is now located adjacent to the top surface cavity 26 provided by plug 24 instead of adjacent to its bottom surface provided by the bottom of cup 22. Furthermore, each successive half cycle has conditions which look similar. In this idealized vertical planar operation of assembly 1, aggregate 30 initially acquires kinetic energy from the impulse and then loses kinetic energy due to its initial inelastic deceleration by the top surface of cavity 26. Aggregate 30 is later accelerated by the oscillation and the, acquiring kinetic energy, and then the modified system loses kinetic energy due to the inelastic deceleration of aggregate 30 by the bottom surface of cavity 26. Assembly 1, due to this acquisition and subsequent loss of kinetic energy, damps the oscillation in its first cycle, and it continues to damp the oscillation in this manner as the oscillation proceeds through subsequent cycles.

In this idealized vertical planar operation of assembly 1, the free travel distance affects a point in the oscillation's cycle at which the initial deceleration of aggregate 30 by plug 24 occurs. The upward impulse, occurring at 0 degrees in the oscillation's cycle, imparts the initial upward absolute velocity $V_0$ to enclosure 20 and aggregate 30. After traveling the free travel distance in cavity 26, aggregate 30, in total, will be decelerated by plug 24 at a "collision time" $T_C$ given by $T_C = D/V_0$ where D is the free travel distance. While aggregate 30 is traveling unrestrained upwardly in cavity 26, its mass does not affect the oscillation's frequency, so, during this interval of time, the oscillation's frequency is the intrinsic system's frequency f. The collision time $T_C$ can be expressed in degrees of the intrinsic oscillation's cycle, and this angularly defined collision time, $T_{CD}$, is given by the formula $T_{CD} = T_C * f * 360$. Substituting for $T_C$ gives $T_{CD} = D * f * 360 / V_0$.

The free travel distance of aggregate 1 is a factor in determining an effectiveness of assembly 1 in attenuating oscillation because of its effect on the angularly defined collision time $T_{CD}$ of aggregate 30 discussed above. This can be understood by looking specifically at decelerations of aggregate 30 by plug 24 which occur at 60, 90, and 120 degrees in the intrinsic oscillation's cycle. The following calculations concern the prototype of assembly 1 affixed to the performance ski 10 mentioned above in which aggregate 30 has a mass which is approximately 25% of the equivalent mass of the intrinsic system at axis 27.

At the 60 degree deceleration of aggregate 30 by plug 24, plug 24 has an upwardly directed absolute velocity with a magnitude approximately half that of its initial absolute velocity at 0 degrees, or $V_0/2$, it having been reduced primarily by the stiffness of ski 10 and slightly by the intrinsic damping of the intrinsic system. Since aggregate 30 is assumed to have no rebound in its perpendicular deceleration by plug 24, after the deceleration its relative velocity is zero and its absolute velocity is the same as the absolute velocity of plug 24. Momentum conservation requires that, immediately after the 60 degree deceleration, the modified system has an upward absolute velocity at axis 27 which is approximately 60% of the initial velocity $V_0$. Kinetic energy in the modified system is reduced by approximately 20% of the kinetic energy existing in aggregate 30 when traveling at the initial absolute velocity $V_0$. At the 90 degree deceleration, plug 24 has approximately zero absolute velocity. Momentum conservation requires that, immediately after the 90 degree deceleration, the modified system has an upward absolute velocity at axis 27 which is approximately 20% of the initial velocity $V_0$. Kinetic energy in the modified system is reduced by approximately 80% of the kinetic energy existing in aggregate 30 when traveling at the initial absolute velocity $V_0$. At the 120 degree deceleration, plug 24 has a downward absolute velocity with a magnitude of approximately $V_0/2$. Momentum conservation requires that, immediately after the 120 degree deceleration, the modified system has a downward absolute velocity at axis 27 which is approximately 20% of the initial velocity $V_0$. Kinetic energy in the modified system is reduced by approximately 180% of the kinetic energy existing in aggregate 30 when traveling at the initial absolute velocity $V_0$.

These calculations show the importance of the free travel distance in determining the effectiveness of assembly 1. They show that assembly 1 has significant kinetic energy reduction, and hence oscillation attenuation, for decelerations which occur at 90 degrees or later in the intrinsic oscillation's cycle. Therefore, a term "amplitude threshold" is useful in defining assembly 1, it being defined herein as the amplitude, under idealized vertical planar oscillation operation, at which the initial deceleration of aggregate 30 by plug 24 occurs at 90 degrees in the intrinsic oscillation's cycle.

The amplitude threshold of assembly 1 is determined by the following calculations. As determined above, aggregate 30 is decelerated by the upper surface of cavity 26 provided by plug 24 at, expressed in degrees of oscillation, a time $T_{CD}$ given by the formula $T_{CD} = D * f * 360 / V_0$. Substituting 90 degrees for $T_{CD}$ gives $V_0 = 4 * D * f$. But when the intrinsic system has reached 90 degrees in the intrinsic oscillation's cycle, the intrinsic system's equivalent mass m is momentarily at rest and all the kinetic energy which was imparted to it by the impulse changes to a potential energy existing in the deflection of the forward portion of ski 10 against its equivalent stiffness k. The intrinsic system's initial kinetic energy $E_{K0}$ is given by the formula $E_{K0} = 0.5 * m * V_0^2$, and the maximum potential energy in the intrinsic oscillation's cycle, $E_{Pmax}$, is given by $E_{Pmax} = 0.5 * k * A^2$ where A is the maximum amplitude of the intrinsic oscillation. Ignoring a relatively small effect resulting from intrinsic damping which occurs in the first 90 degrees in the intrinsic oscillation's cycle, the initial kinetic energy $E_{K0}$ equals the maximum potential energy $E_{Pmax}$, so therefore $V_0 = \sqrt{k/m} * A$. But $\sqrt{k/m}$ equals the intrinsic frequency f, giving $V_0 = f * A$. Substituting this into the above formula $V_0 = 4 * D * f$ gives $A = 4 * D$. The amplitude threshold of assembly 1 is therefore four times its free travel distance.

The amplitude threshold of assembly 1, when in its idealized vertical planar oscillation operation, determines a dividing line between decelerations of aggregate 30 with enclosure 20. At oscillation amplitudes greater than the amplitude threshold, the damping effect of assembly 1 is lessened because, at the initial deceleration of aggregate 30 by plug 24, aggregate 30 and enclosure 20 have absolute velocities whose vectors are in substantially the same direction. At oscillation amplitudes less than the amplitude threshold, the damping effect of assembly 1 is enhanced because, at the initial deceleration, aggregate 30 and enclosure 20 have opposed absolute velocities.

The discussions above concerned the idealized vertical planar oscillation operation of assembly 1 wherein aggregate 30 has velocity vectors lacking components perpendicular to the side surface of cavity 26. In this operation, aggregate 30, therefore, is decelerated exclusively by the top and bottom surfaces of cavity 26 established by plug 24 and the bottom of cup 22. But in the likely event that ski 10 has horizontal and/or torsional oscillation, portions of aggregate 30 may possess velocity vectors having components which are perpendicular to axis 27. This potentially results in perpendicular decelerations of aggregate 30 by the side surface of cavity 26, and these decelerations will attenuate these oscillations. Therefore, it has been found beneficial to make a horizontal dimension of cavity 26, like its vertical dimension, large relative to the thickness of ski 10 adjacent to enclosure 20. Under these conditions, assembly 1 is able to attenuate all three oscillation modes due the ability of aggregate 30 to travel relatively unrestrained in all directions in cavity 26 and to have decelerations by all surfaces of cavity 26.

These concepts of amplitude threshold and free travel distance, adequately provided for in assembly 1, separate this apparatus from earlier damping devices such as the prior art devices described above. The concept of amplitude threshold explains in part why damping assembly 1 is more effective than the damping device shown in FIG. 3 of German Patent 1,960,408. The above-mentioned performance ski 10, measured perpendicularly to running surface 12 at a location adjacent to enclosure 20, has a thickness between running surface 12 and top surface 14 of approximately 0.7 cm. This means that a damping device used with this performance ski 10 and located internally to it as similarly shown in FIG. 3 of 1,960,408 would, of necessity, have a free travel distance D which was less, and even substantially less, than 0.7 cm. This means that its amplitude threshold would be less, and even substantially less, than 2.8 cm. Video analysis of skiing indicates that vertical oscillation amplitudes much greater than 2.8 cm occur, therefore locating a damping device internally to ski 10, as shown in FIG. 3 of 1,960,408, would have limited attenuation for these oscillations. Also, FIG. 3 of 1,960,408 shows its cavity being divided into a plurality of prismatic cells, and this division limits the effectiveness of this device to significantly damp oscillations containing horizontal and/or torsional oscillation modes. Also, the concept of providing the free travel distance for aggregate 30 in assembly 1 separates it from earlier concepts in which an aggregate was tightly packed in a space, such as those concepts expressed in U.S. Pat. Nos. 5,678,840 and 4,674,763 mentioned above. An aggregate which is tightly packed in an enclosure is limited in its ability to attenuate oscillation, especially oscillations with relatively large amplitudes.

It is desirable that the mass of aggregate 30 be relatively large in order for it to have a relatively good ability to attenuate oscillation. But a conflict exists due to the fact that, for any given size and shape of cavity 26 and for any given tapped density of aggregate 30, increasing the mass of aggregate 30 will decrease the free travel distance of assembly 1, thereby decreasing its amplitude threshold and effectiveness for oscillations with relatively large amplitudes. Therefore, it is desirable that the tapped density of aggregate 30 be as large as possible while considering cost, availability, and damping characteristics of the material or materials of which it is comprised. To this end, as discussed above, a mixture of course and fine aggregates for aggregate 30 has been found to be effective. A relatively economical material having a relatively high material density which has been used effectively for the course aggregate is lead shot, particularly lead bird shot size 7½ having a diameter of 2.39 mm. These pellets are substantially spherical in shape, and spheres, when in a condition of having their tapped density, occupy a maximum of 74% of the gross space they occupy, the other 26% being interstitial spaces. If a coarse aggregate, such as the lead shot described, is a component of aggregate 30, it has been found beneficial to add a fine aggregate, a powder, to aggregate 30 to occupy a portion of the interstitial spaces and thereby increase, in total, its tapped mass density. A powder which has been used effectively is a tungsten powder having a mesh size of approximately 200. With this selection of materials, aggregate 30 has a tapped density of approximately 12 grams per cubic centimeter.

The BSC clamped tip test was used to determine how effectively a prototype of assembly 1 attenuates oscillation. The test was performed on the previously mentioned performance ski 10 before the assembly 1 prototype was affixed, so in this case the intrinsic system was ski 10 alone. Ski 10, at a location of axis 27 mentioned below, was given an initial deflection of approximately 5 cm. This test showed that ski 10 had an intrinsic frequency f of about 8 cycles per second and an intrinsic damping which yielded a cyclical amplitude ratio, CAR, of approximately 0.85. CAR is herein defined as the ratio of an oscillation's amplitude to its preceding amplitude having the same deflection direction. Enclosure 20 of the assembly 1 prototype, using a suitable adhesive 28, was affixed to the top surface 14 of ski 10 so that axis 27 was positioned approximately 10 cm from tip 16. The prototype's cup 22 and plug 24 were manufactured from aluminum. Its aggregate 30 contained a coarse aggregate, 28 grams of #7½ lead bird shot, and a fine aggregate, 18 grams of 200 mesh tungsten powder. Its enclosure 20 encompassed a substantially cylindrical cavity 26 having a height measured along axis 27 of approximately 2.5 cm and a diameter of slightly greater than 2.5 cm. Aggregate 30 had a tapped aggregate cylinder height of approximately 0.5 cm, providing a free travel distance D for the prototype of approximately 2 cm and therefore an amplitude threshold of approximately 8 cm. The performance ski 10 with assembly 1 attached was tested, again with an initial deflection at axis 27 of approximately 5 cm. The modified oscillation of the modified system, ski 10 with the assembly 1 prototype attached, had a modified frequency f' which was slightly less than the intrinsic frequency f and it had a CAR, averaged over the first four oscillation cycles, of approximately 0.69. The modified system with its CAR of 0.69 experienced significantly more oscillation damping than that experienced by the intrinsic system with its CAR of 0.85.

DESCRIPTION AND OPERATION—FIG. 4—Second Embodiment

FIG. 4 is a partial sectional view of a second embodiment of a damping apparatus of this application, a damping assembly 1' attached to a gliding device, a ski 10'. Ski 10' is similar to ski 10 in that it has gliding surface 12, tip 16, tail 17, and waist 18, but it has a top surface 14' which differs from top surface 14 in that it excludes an area defined by a recess 29 located near tip 16. Damping assembly 1' has an enclosure 20' which is an assembly comprising a cup 22' and plug 24. Enclosure 20' encompasses a cavity 26', again shown as, for instance, being substantially cylindrical with cup 22' providing the cylinder's side and bottom surfaces and plug 24 providing its top surface. Cavity 26' and enclosure 20' again have symmetry with respect to an axis, axis 27. Adhesive 28 secures enclosure 20' in recess 29.

Assembly 1' also comprises a damping material, an aggregate 30' having an aggregate surface, surface 32. Assembly 1', as in assembly 1, contains protective cover 40.

Under the same limitations discussed above, placing enclosure 20' in recess 29 allows cup 22' to be taller than cup 22, thereby allowing cavity 26' to have a longer dimension along axis 27 than cavity 26, and allowing cavity 26' to be longer, relative to the thickness of ski. 10' adjacent to enclosure 20', than the length of cavity 26 relative to the thickness of ski 10 adjacent to enclosure 20. Under an assumption that aggregates 30 and 30' have the same tapped density and cavities 26 and 26' have the same shape in cross-section, this allows for one of three possibilities. The first possibility is to maintain the same free travel distance in assembly 1' as that which existed in assembly 1, thereby providing for aggregate 30', in total, to be more massive than aggregate 30. The second possibility is to maintain the same mass in the two aggregates, thereby providing for the free travel distance in assembly 1' to be longer than it is in assembly 1. The third possibility is a combination of the first two wherein aggregate 30' is slightly more massive than aggregate 30 and the free travel distance in assembly 1' is slightly longer than it is in assembly 1. Any of these three possibilities are opportunities to make assembly 1' more effective than assembly 1 in providing oscillation attenuation, especially for oscillations with relatively large amplitude.

CONCLUSION, RAMIFICATIONS, AND SCOPE

Accordingly, the reader will see that the apparatus disclosed in the two embodiments presented in this application attenuates, or damps, oscillation, vertical planar, horizontal, and torsional, in a ski. The apparatus comprises an enclosure, a cavity encompassed by the enclosure, and a damping material located in the cavity. The cavity has a dimension in a direction substantially perpendicular to a gliding surface of the ski which is greater than the ski's thickness at a location adjacent to the enclosure. The apparatus allows substantially unrestrained travel of its damping material in the cavity during a time interval of the oscillation followed by an inelastic deceleration by a surface of the cavity which reduces a kinetic energy existing in the damping material. Proper selection of the damping material, an aggregate with a relatively high mass density and good damping characteristics, along with sizing the cavity to allow relatively long travel distances for the damping material, allows the apparatus to provide significant attenuation of oscillations having relatively large amplitudes.

Although the description above contains many specificities, these should not be construed as limiting the scope of the embodiments but as merely providing illustrations of two embodiments. For instance, the embodiments are discussed as being attached near a ski's tip, but attachment near its tail at times may be beneficial. There are many possibilities for the aggregate as long as it has a sufficient ability to have inelastic collisions with an enclosure. The cavities presented are substantially cylindrical with a circular cross section, but other cavity shapes with other cross-sections will work. Thus, the scope of the embodiments should be determined by the appended claims and their legal equivalents rather than by the examples given.

I claim:

1. An apparatus which attenuates oscillation in a ski, the apparatus comprising:
    an enclosure,
    a cavity encompassed by the enclosure,
    and an aggregate located in the cavity,
    wherein the ski has a gliding surface on its lower side and a top surface on its upper side,
    wherein the cavity has a dimension, measured along a line which passes through the cavity and which is substantially perpendicular to the gliding surface, which is greater than a thickness of the ski between its gliding surface and its top surface measured substantially perpendicularly to its gliding surface at a location adjacent to the enclosure,
    wherein the cavity has a volume, the aggregate has a mass and a tapped density which establishes a tapped volume of the aggregate, and the cavity's volume is larger than the aggregate's tapped volume,
    and wherein an oscillation in the ski causes a first acceleration of the enclosure, causing the aggregate, in total, to be located in a space adjacent to a first surface of the cavity and then to accelerate and acquire kinetic energy, and then the oscillation causes a second acceleration of the enclosure, causing a portion of the aggregate to leave the space adjacent to the first surface of the cavity and travel substantially unrestrained in the cavity, after which a second surface of the cavity causes it to inelastically decelerate and, in total, lose kinetic energy,
    whereby the aggregate's acquisition and subsequent loss of kinetic energy attenuates the oscillation.

2. The apparatus of claim 1 wherein the aggregate is a mixture of, relatively speaking, a coarse aggregate and a fine aggregate.

3. The apparatus of claim 2 wherein the coarse aggregate has a mesh size less than 30 and the fine aggregate has a mesh size greater than 30.

4. The apparatus of claim 2 wherein the coarse aggregate comprises lead pellets and the fine aggregate comprises a tungsten powder.

5. The apparatus of claim 2 wherein the aggregate has a tapped density which is greater than a tapped density of the coarse aggregate.

6. The apparatus of claim 2 wherein the aggregate has a tapped density greater than 10 grams per cubic centimeter.

7. The apparatus of claim 1 wherein the apparatus is located near a tip of the ski.

8. The apparatus of claim 1 wherein the apparatus is located near a tail of the ski.

9. The apparatus of claim 1 wherein the enclosure is secured to the top surface of the ski.

10. The apparatus of claim 1 wherein a distance, measured along the line, between the gliding surface and the enclosure is less than the thickness of the ski at the location adjacent to the enclosure.

11. The apparatus of claim 1 wherein the enclosure's first and second accelerations have vectors which are substantially opposed, whereby the oscillation is substantially planar.

12. An apparatus which attenuates oscillation in a ski, the apparatus comprising:
    an enclosure,
    a cavity encompassed by the enclosure,
    and an aggregate located in the cavity,
    wherein the ski has a gliding surface on its lower side and a top surface on its upper side,
    wherein the cavity has a dimension, measured along a line which passes through the cavity and which is substantially perpendicular to the gliding surface, which is greater than a thickness of the ski between its gliding surface and its top surface measured substantially perpendicularly to its gliding surface at a location adjacent to the enclosure, wherein, with the aggregate in its tapped aggregate space with the line positioned in a vertical orientation, the aggregate establishes a substantially planar surface which divides the cavity into a lower portion which contains the aggregate and an upper portion which is absent the aggregate, whereby a length of a segment of the line with endpoints at the line's intersections with the cavity's upper portion is a free travel distance of the aggregate.

13. The apparatus of claim 12 wherein the aggregate's free travel distance is longer than the ski's thickness at the location adjacent to the enclosure.

14. The apparatus of claim 12 wherein the apparatus, when in an idealized vertical planar operation, has an amplitude threshold which is substantially four times the free travel distance of the aggregate.

15. The apparatus of claim 12 wherein the cavity has an axis of symmetry and the line and the axis of symmetry are coaxial.

16. The apparatus of claim 12 wherein the free travel distance is longer than a segment of the line with endpoints at the line's intersections with the lower portion of the cavity.

17. A modified gliding device comprising:

a gliding device having a gliding surface on its lower side and a top surface on its upper side, and an apparatus which attenuates oscillation in the modified gliding device, the apparatus comprising an enclosure, a cavity encompassed by the enclosure, and an aggregate located in the cavity, wherein the cavity has a dimension, measured along a line which passes through the cavity and which is substantially perpendicular to the gliding surface, which is greater than a thickness of the gliding device between its gliding surface and its top surface measured substantially perpendicularly to its gliding surface at a location adjacent to the enclosure, wherein the cavity has a volume, the aggregate has a mass and a tapped density which establishes a tapped volume of the aggregate, and the cavity's volume is larger than the aggregate's tapped volume, and wherein an oscillation in the gliding device causes a first acceleration of the enclosure, causing the aggregate, in total, to be located in a space adjacent to a first surface of the cavity and then to accelerate and acquire kinetic energy, and then the oscillation causes a second acceleration of the enclosure, causing a portion of the aggregate to leave the space adjacent to the first surface of the cavity and travel substantially unrestrained in the cavity, after which a second surface of the cavity causes it to inelastically decelerate and, in total, lose kinetic energy, whereby the aggregate's acquisition and subsequent loss of kinetic energy attenuates the oscillation.

18. The modified gliding device of claim 17 wherein the aggregate is inelastically decelerated at a point in the oscillation wherein the enclosure is momentarily substantially at rest and the oscillation has an amplitude, and wherein the amplitude is an amplitude threshold of the apparatus.

19. The modified gliding device of claim 17 wherein the aggregate, containing multiple particles, loses kinetic energy resulting from collisions of a portion of its particles with the second surface and from collisions between its particles.

20. The modified gliding device of claim 17 wherein the cavity has a dimension, measured in a direction perpendicular to the line, which is greater than the thickness of the gliding device at the location adjacent to the enclosure, whereby an oscillation which accelerates the enclosure in a direction perpendicular to the line will be attenuated.

* * * * *